United States Patent
Arakane et al.

(10) Patent No.: US 8,200,296 B2
(45) Date of Patent: *Jun. 12, 2012

(54) FOLDABLE MOBILE EQUIPMENT

(75) Inventors: Toyohiro Arakane, Hiroshima (JP); Kimiaki Imai, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 924 days.

This patent is subject to a terminal disclaimer.

(21) Appl. No.: 12/159,073

(22) PCT Filed: Dec. 25, 2006

(86) PCT No.: PCT/JP2006/325812
§ 371 (c)(1),
(2), (4) Date: Jun. 24, 2008

(87) PCT Pub. No.: WO2007/080775
PCT Pub. Date: Jul. 19, 2007

(65) Prior Publication Data
US 2009/0104942 A1    Apr. 23, 2009

(30) Foreign Application Priority Data

Jan. 13, 2006   (JP) .................... 2006-006498

(51) Int. Cl.
*H04M 1/00* (2006.01)

(52) U.S. Cl. ........... 455/575.3; 455/566; 455/575.1; 455/575.4

(58) Field of Classification Search ..... 455/575.3–575.4
See application file for complete search history.

(56) References Cited

U.S. PATENT DOCUMENTS

| 5,629,833 | A | 5/1997 | Ido et al. |
| 6,486,853 | B2* | 11/2002 | Yoshinomoto et al. ........ 343/895 |
| 6,731,753 | B2 | 5/2004 | Park et al. |
| 7,174,195 | B2 | 2/2007 | Nagamine |
| 7,546,150 | B2* | 6/2009 | Makino ...................... 455/575.1 |
| 2001/0034229 | A1 | 10/2001 | Park et al. |
| 2003/0203747 | A1* | 10/2003 | Nagamine ................. 455/575.3 |
| 2003/0223576 | A1 | 12/2003 | Totani |
| 2005/0091431 | A1 | 4/2005 | Olodort et al. |
| 2005/0122311 | A1* | 6/2005 | Lee et al. ...................... 345/158 |

FOREIGN PATENT DOCUMENTS

| EP | 0 703 401 A1 | 3/1996 |
| EP | 1 357 726 A1 | 10/2003 |
| EP | 1 542 433 A1 | 6/2005 |
| GB | 2 389 477 A | 12/2003 |
| JP | 8-63259 A | 3/1996 |
| JP | 8-317027 A | 11/1996 |

(Continued)

*Primary Examiner* — Charles Appiah
*Assistant Examiner* — Jaime Holliday
(74) *Attorney, Agent, or Firm* — Birch, Stewart, Kolasch & Birch, LLP

(57) ABSTRACT

Foldable mobile equipment is provided with a first housing 3 including a liquid crystal display part (display part) at the front face thereof, a second housing 5 including an operation part at the front face thereof, and a hinge portion 6 connecting the first housing 3 and the second housing 5 to each other foldably about an open/close axis X and supporting the first housing 3 so that the first housing 3 can be flipped over about a vertical axis Y vertical to the open/close axis X. The liquid crystal display part is supported on the first housing 3 by means of a cam mechanism 10 (a support mechanism) so as to be switchable between a portrait orientation and a landscape orientation.

10 Claims, 15 Drawing Sheets

FOREIGN PATENT DOCUMENTS

| | | |
|---|---|---|
| JP | 2000-20166 A | 1/2000 |
| JP | 2001-156893 A | 6/2001 |
| JP | 2002-118633 A | 4/2002 |
| JP | 2002-141984 A | 5/2002 |
| JP | 2003-239943 A | 8/2003 |
| JP | 2003-527031 A | 9/2003 |
| JP | 2003-309756 A | 10/2003 |
| JP | 2003-319043 A | 11/2003 |
| JP | 2004-64716 A | 2/2004 |
| JP | 2005-176372 A | 6/2005 |
| JP | 2005-244752 A | 9/2005 |
| WO | WO-01/69805 A1 | 9/2001 |

* cited by examiner

FOLDABLE MOBILE EQUIPMENT

TECHNICAL FIELD

The present invention relates to foldable mobile equipment and particularly relates to foldable mobile equipment of which display part is rotatably supported.

BACKGROUND ART

In recent years, mobile phones are provided with various capabilities in addition to the communication function, such as e-mail transmission/reception, digital camera shooting, recording/reproducing, television reception, scheduling and so on.

There is a demand to view a display part with the mobile phone folded small in using a given function out of these plural functions. In order to meet this demand, a mobile phone has been proposed which includes two pivots rotating independently of each other in a hinge portion foldably connecting a first housing including a display part and a second housing including an operation part.

For example, Patent Document 1 discloses electronic equipment in which a main body including an operation part and an overlap part including a display part are connected to each other so as to cover the operation part in non-operation state, wherein the overlap part is provided about a pivot part so as to be capable of rising and a rotatable part intersecting substantially at a right angle with the pivot is provided to allow the overlap part to be rotatable within the range of 180 degrees, whereby the overlap part can be flipped over. It is known that flipping over the overlap part of this electronic equipment can hide and expose the display part with the equipment folded compactly.

Patent Document 2 discloses a mobile phone with zoom lenses in which: a shooting lens and a plurality of zoom lenses are arranged on the central axis of a hinge portion; a liquid crystal monitor part including a liquid crystal monitor and an operation part including operation buttons are connected to each other rotatably by means of the hinge portion; and a rotating plate is provided between the hinge portion and the liquid crystal monitor part so as to be rotatable in the range from zero degree to 360 degrees. It is known that this mobile phone with the zoom lenses can shoot a self-portrait when the liquid crystal monitor part is rotated 90 degrees clockwise and can shoot another person when the liquid crystal monitor part is rotated 90 degrees anticlockwise on the rotating plate.

Patent Document 3 discloses a foldable mobile phone including a first rotation shaft for closing both the housings and a second rotation shaft intersecting at a right angle with the first rotation shaft. In this foldable mobile phone, when the display part is rotated 180 degrees and is then closed, the display part comes into sight so as to be viewed in a receiving condition without manipulation for opening/closing the housings. It is known that four direction keys and an enter key are provided at the lower part of the display part, and therefore, the user can view the display part when using these keys for playing a video game or so with the display part in the compactly closed state flipped over.

The main function of the mobile phones is making and receiving calls still. For greater portability and salability of the mobile phones, importance has been placed on downsizing and weight reduction. In view of usability, the mobile phones are oriented portrait and reduced in width.

When the liquid crystal display parts of the aforementioned mobile phones are fixed portrait, a landscape image needs to be scaled down so that the image fits in the portrait screen or the user has to scroll the image horizontally to see the whole image.

Alternatively, the landscape image may be rotated 90 degrees for showing it in the liquid crystal display part in the portrait orientation. However, in a foldable mobile phone in which the liquid crystal part and the operation part come in sight when the first housing and the second housing are opened, the operation part is also rotated 90 degrees, which means that the user sees the indications marked in the information input buttons and the like which are rotated 90 degrees and arranged in a different layout from the usual one. It is troublesome and difficult for the user to do input with the operation keys in such an unusual layout.

To solve these problems, for example, Patent Document 4 discloses a foldable mobile phone of which liquid crystal display part supported on the first housing so as to be switchable from the portrait orientation to the landscape orientation even when the foldable mobile phone itself is held portrait. The liquid crystal display part of this foldable mobile phone is supported by a support shaft arranged at the center of the liquid crystal display part vertically to the liquid crystal display part such that the liquid crystal display part is rotated 90 degrees about the support shaft.

In a foldable mobile phone in Patent Document 5, the liquid crystal display part is pivotally supported on a support part connecting the liquid crystal display part to a base part of the mobile phone main body, and a displayed content is changed according to the orientation of the display screen.

As shown in Patent Document 6, a foldable mobile phone is known which includes a support mechanism supporting the liquid crystal display part rotatably about and slidably on the first housing. In this foldable mobile phone, the liquid crystal display part is made to slide vertically and is then rotated about the support shaft provided at the center of the liquid crystal display part, thereby avoiding contact with the hinge portion and a protruding portion at the lower end of the first housing to thus increase the size of the liquid crystal display part.

Patent Document 1: Japanese Unexamined Patent Application Publication 2003-239943
Patent Document 2: Japanese Unexamined Patent Application Publication 2003-309756
Patent Document 3: Japanese Unexamined Patent Application Publication 2002-118633
Patent Document 4: Japanese Unexamined Patent Application Publication 2001-156893
Patent Document 5: Japanese Unexamined Patent Application Publication 2004-64716
Patent Document 6: Japanese Unexamined Patent Application Publication 2003-319043

DISCLOSURE OF THE INVENTION

Problems that the Invention is to Solve

Meanwhile, terrestrial digital broadcasting will begin in the near future regularly. Different from the conventional analog broadcasting, the terrestrial digital broadcasting provides generally-called bidirectional services, such as participation of a quiz program through a television, utilization of teleshopping, bank transfer, and the like through a television, and so on.

In the case where a mobile phone is set capable of showing a terrestrial digital TV program, demand for key operation through the operation part with an image in the liquid crystal display part viewed will increase more and more. Usually, the television image is in the landscape orientation, and therefore, the liquid crystal display part has to be set landscape for viewing the television image as large as possible in the small liquid crystal display part.

In the inventions in Patent Documents 4 and 5, however, it is necessary to round the lower end of the liquid crystal display part along the radius about the support shaft or to take another countermeasure for rotating the liquid crystal display part while preventing it from coming into contact with the hinge portion connecting the first housing and the second housing closably to each other, the protruding portion provided at the lower end of the first housing where the liquid crystal display part is provided, and the like with an increase in size and thickness of the mobile phone suppressed. This inhibits an increase in the liquid crystal display part.

The foldable mobile phone in Patent Document 6 requires two-step manipulation of sliding and rotation, which cannot be attained by a single hand and means complicated manipulation.

There is another demand for playing a video game or so with the housing including the display part closed compactly as disclosed in Patent Documents 1 to 3 and with the display part set landscape as disclosed in Patent Documents 4 to 6.

In the invention disclosed in Patent Document 3, the user can view the display part in the landscape orientation in using the four direction keys and the enter key for playing a video game or so even in a state that the display part is closed compactly and flipped over. When this foldable mobile phone in the landscape orientation is held, however, the four direction keys and the enter key arranged on the left side cannot be manipulated by a single hand but has to be manipulated by both hands. Further, the information input buttons cannot be manipulated in the landscape orientation.

The present invention has been made in view of the foregoing and has its object of providing foldable mobile equipment which enables the user to view a display part in a landscape orientation in manipulating easily an operation part in which information input buttons and the like are arranged in the same layout as the accustomed layout in a portrait orientation and which enables the user to play a video game or so comfortably with the display part closed compactly and set landscape.

Means for Solving the Problems

In order to attain the above object, a first aspect of the present invention provides foldable mobile equipment which includes: a first housing including a display part at a front face thereof; a second housing including an operation part at a front face thereof; a hinge portion which connects the first housing and the second housing to each other foldably about an open/close axis and supports the first housing so that the first housing is capable of being flipped over about a vertical axis vertical to the open/close axis, wherein the display part is supported on the first housing through a support mechanism switchably between a portrait orientation and a landscape orientation.

In the above arrangement, the mobile equipment is used with the display part set portrait in general in using any of the main functions, such as making/receiving calls, mail transmission/reception, and the like. On the other hand, when the mobile equipment is used for watching a terrestrial digital TV program or transmitting/receiving a mail in English language, the user uses it for doing key input through the operation part in which the information input buttons are arranged in the same layout as the accustomed layout in the portrait orientation. In order to switch the display part between the portrait orientation and the landscape orientation, the user himself/herself is required to change the orientation of the display part supported on the first housing. In this changing, the display part is guided and supported by the support mechanism. The first housing is supported so as to be flipped over about the vertical axis. Accordingly, when the display part in the portrait orientation is flipped over about the vertical axis and is then closed, the display part is set landscape in a compactly closed state, so that the user can view the display part in the landscape orientation in doing key input by a single hand through the operation part not covered with the display part for playing a video game or so.

Referring to a second aspect of the present invention, in the first aspect, the support mechanism guides and supports the display part so that a lower end corner of the display part moves along the hinge portion in switching the display part between the portrait orientation and the landscape orientation.

With the above arrangement, the support mechanism guides and supports the display part so that the lower end corner thereof moves along the hinge portion, thereby switching the display part. Accordingly, the display part moves with the space from the hinge portion kept, so that the display part does not collide with the hinge portion, the protruding portion at the lower end of the first housing, and the like even if the lower end of the display part is not rounded along the radius about the support shaft as in the conventional case. Hence, the first housing can be rotated about the vertical shaft without inviting contact thereof with the hinge portion either in the portrait orientation or in the landscape orientation.

Referring to a third aspect of the present invention, in the first or second aspect, either widthwise center of the display part in the portrait orientation or in the landscape orientation is located at a substantial widthwise center of the first housing in the respective orientations.

In the case where the support shaft for supporting the display part on the first housing is provided at the center of the display part as in the conventional case, the upper end corners of the display part in the portrait orientation must be rounded as well as the lower end corners thereof in order to position the widthwise center of the display part in the landscape orientation at the substantial widthwise center of the first housing, thereby reducing the size of the display part as a whole. In contrast, in the present invention, the support mechanism guides the display part so that the lower end corner of the display part moves along the hinge portion in switching the display part between the portrait orientation and the landscape orientation. This eliminates the need to provide the support shaft at the center as in the conventional case, and accordingly, it is unnecessary to set the upper end level of the display part low in the portrait orientation. Further, the display part is positioned at the widthwise center of the first housing not only in the portrait orientation but also the landscape orientation, so that flip-over of the display part results in positioning thereof at the widthwise center of the operation part.

Referring to a fourth aspect of the present invention, in any one of the first to third aspects, the support mechanism is composed of a cam mechanism.

With the above arrangement, the cam mechanism with such a simple structure guides the display part definitely so that the lower end corner moves along the hinge portion.

Referring to a fifth aspect of the present invention, in the fourth aspect, the cam mechanism guides and supports the display part so that the lower end corner of the display part moves along the hinge portion on a straight track in switching the display part between the portrait orientation and the landscape orientation, and the display part has a linear lower end in the portrait orientation.

With the above arrangement, the display part is guided and supported by the cam mechanism in switching so that the lower end corner thereof moves along the hinge portion on the linear track. Accordingly, the display part does not come into contact with the hinge portion and the like in switching the display part between the portrait orientation and the landscape orientation and in flipping-over thereof even if the display part has the linear lower end.

Referring to a sixth aspect of the present invention, in the fifth aspect, the cam mechanism is composed of a transversely extending and upwardly curved transverse guide groove formed in the first housing, and a linear vertical guide groove formed in the first housing, a first guide pin provided at a back face of the display part and slidably engaged with the transverse guide groove, and a second guide pin provided at the back face of the display part and slidably engaged with the vertical guide groove.

With the above arrangement, the cam mechanism allows the first guide pin of the display part to slide with it engaged with the transverse guide groove while allowing the second guide pin thereof to slide with it engaged with the vertical guide groove. Under this movement restriction by the cam mechanism, the lower end corner of the display part moves along the hinge portion to thus switch the display part between the portrait orientation and the landscape orientation.

Referring to a seventh aspect of the present invention, in any one of the first to sixth aspects, the operation part includes information input buttons near the hinge portion and a function button apart from the hinge portion.

With the above arrangement, key in out is carried out through the operation part in which the information input buttons and the function button are arranged in the same layout as the accustomed layout in the portrait orientation with the display part in non-flipped state set landscape so that a landscape image is displayed large in the display part. When the first housing is closed compactly with the display part flipped over so that the display part in the landscape orientation is exposed, the user can use the function buttons not covered with the display part for playing a video game, watching a terrestrial digital TV program, or so.

Referring to eighth or ninth aspect of the present invention, in any one of the first to seventh aspect, the display part may include a liquid crystal display or an organic EL display.

With any of the above arrangements, an appropriate display is selected in view of the cost and the image quality.

Referring to a tenth aspect of the present invention, in any one of the first to ninth aspects, the foldable mobile equipment may be a foldable mobile phone as one example.

With the above arrangement, the mobile phone set in various states is used, for example, for playing a video game with the mobile phone folded compactly and the display part set landscape.

Effects of the Invention

As described above, in the foldable mobile phone in accordance with the present invention, the first housing and the second housing are connected to each other foldably about the open/close axis by means of the hinge portion, the first housing is supported so as to be capable of being flipped over about the vertical axis, and the display part is supported on the first housing by means of the support mechanism so as to be switchable between the portrait orientation and the landscape orientation. Accordingly, the user can manipulate easily the operation part in which the input information buttons and the like are arranged in the same layout as the accustomed layout in the portrait orientation when viewing the display part in the landscape orientation, and the user can play a video game or so comfortably with the display part in the compactly closed state set landscape.

The support mechanism supports the display part on the first housing so that the display part is switchable between the portrait orientation and the landscape orientation, and guides and supports the display part so that the lower end corner of the display part moves along the hinge portion in switching the display part. This eliminates the need to round large the lower end of the display part to increase the size of the display part with an increase in the entire size suppressed. Further, the display part can be switched between the portrait orientation and the landscape orientation effortlessly, the display part can be flipped over free from contact with the hinge portion, and the user can manipulate the operation part in which the information input buttons and the like are arranged in the same layout as the accustomed layout in the portrait orientation while viewing the display part even in the landscape orientation.

With the support mechanism, when the display part is switched, which can be done with interference avoided, the widthwise center of the display part either in the portrait orientation or in the landscape orientation can be positioned at the substantial widthwise center of the first housing. Accordingly, the display part can be positioned at the widthwise center of the entire mobile phone not only in the portrait orientation but also in the landscape orientation, and the screen is enlarged as far as possible. This enhances the outer appearance and attains easy viewing of the screen and good balance in the transverse direction, thereby resulting in a foldable mobile phone which can be held easily even by a single hand and has excellent usability.

Since the cam mechanism is used as the support mechanism, the display part is guided definitely so that the lower end corner thereof moves along the hinge portion, thereby attaining switching free from the contact.

The display part is formed to have the linear lower end in the portrait orientation, and the cam mechanism guides and supports the display part in switching of the display part between the portrait orientation and the landscape orientation so that the lower end corner moves along the hinge portion on the linear track. This leads to enlargement of the display screen up to the vicinity of the lower end of the display part, attaining a foldable mobile phone with a further large screen and excellent usability.

The first guide pin of the display part engaged with the transverse guide groove slides while at the same time the second guide pin thereof engaged with the vertical guide groove slides, so that the lower end corner of the display part moves along the hinge portion in switching the display part between the portrait orientation and the landscape orientation. This simple structure prevents the contact and attains easy and definite switching of the display part between the portrait orientation and the landscape orientation.

Further, the information input buttons are provided near the hinge portion of the operation part while the function key is provided apart from the hinge portion so that the first housing can be closed even when the display part in the landscape orientation is flipped over and exposed. Accordingly, the user can comfortably use the function button not covered with the display part for playing a video game or so while viewing the display part in the compactly closed state set landscape.

Provision of the liquid crystal display in the display part attains thin foldable mobile equipment at low cost.

Provision of the organic EL display in the display part achieves high luminance at low power consumption, thereby attaining a foldable mobile equipment excellent ill viewability, speed response, lifetime, and power consumption.

Furthermore, if the mobile equipment is used as a mobile phone, the mobile phone becomes useable in various states of the display part and has excellent salability.

Figure 1:
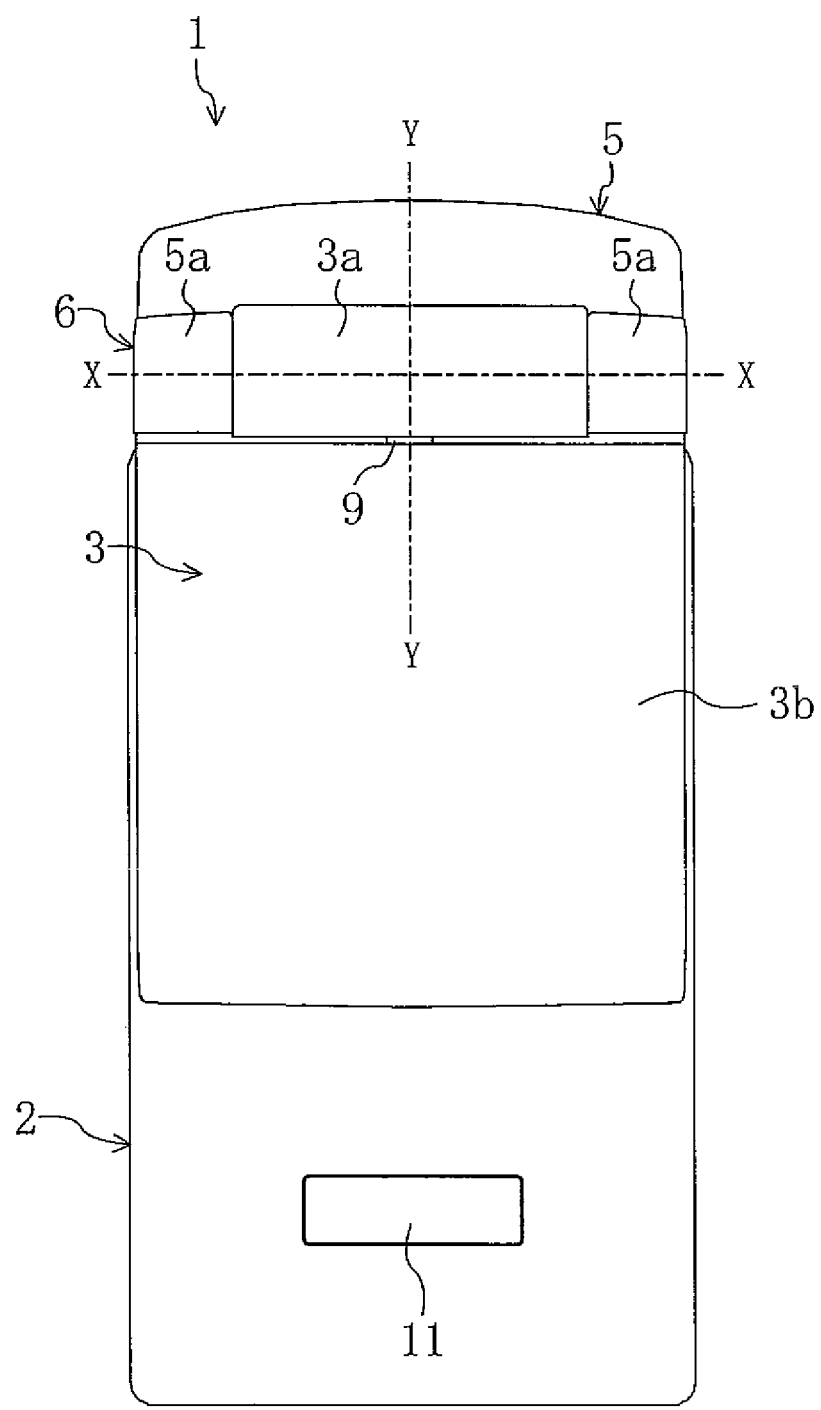
FIG. 1 is a plan view showing a foldable mobile phone in a folded closed state in accordance with an embodiment of the present invention.

EXPLANATION OF REFERENCE NUMERALS 1 foldable mobile phone (foldable mobile equipment)
2 liquid crystal display part (display part)
2b lower end corner
3 first housing
4 operation part
5 second housing
6 hinge portion
10 cam mechanism
12 transverse guide groove
13 first guide pin
14 vertical guide groove
15 second guide pin
31 information input button
32 function button
x open/close axis
Y vertical axis

BEST MODE FOR CARRYING OUT THE INVENTION

Embodiments of the present invention will be described below with reference to the accompanying drawings.

FIG. 1 to FIG. 10 show a foldable mobile phone 1 as foldable mobile equipment in accordance with one embodiment of the present invention. The foldable mobile phone 1 of the present embodiment includes a first housing 3 including a liquid crystal display part 2 as a display part on a face thereof serving as the front face when opened and a second housing 5 including an operation part 4 on one face thereof serving as the front face when opened. The first housing 3 and the second housing 5 are connected to each other foldably by means of a hinge portion 6. Accordingly, the foldable mobile phone 1 is switchable between two states of a folded closed state shown in FIG. 1 to FIG. 3, FIG. 9, and FIG. 10 and an opened state shown in FIG. 4 to FIG. 8.

In the operation part 4 of the second housing 5, information input buttons 31 through which numerals, letters, and the like are input are provided near the hinge portion 6 while a function button 32 for selecting a function of the foldable mobile phone 1 and serving as direction keys (cross keys) and an enter key in playing a video game is provided apart from the hinge portion 6. The information input buttons 31 are arranged in a key input layout when the foldable mobile phone 1 is held portrait, and indications are marked on the surfaces thereof. Manipulation of the information input buttons 31 and the function button 32 attains utilization of multiple functions of the foldable mobile phone 1. Below the operation part 4 of the second housing 5, a microphone 7 for making/receiving calls is provided.

As shown in FIG. 1, a pair of protruding portions 5a forming a part of the hinge portion 6 protrude vertically from the second housing 5 at the respective sides of the hinge portion 6. An open/close axis X passes through the protruding portions 5a so that the first housing 3 and the second housing 5 are connected to each other foldably thereabout.

The first housing 3 includes at the lower end thereof a support portion 3a which is interposed between the pair of protruding portions 5a and through which the open/close axis X passes in the hinge portion 6.

A vertical axis Y vertical to the open/close axis X passes through the support portion 3a. The first housing 3 includes a first housing body 3b supported on the support portion 3a so as to be capable of being flipped over about the vertical axis V. The hinge portion 6 is composed of the support section 3a, the protruding portions 5a, the open/close axis X, and the vertical axis Y, and the like.

Though not shown in detail, a member as a the open/close axis X is made of metal, and an elastic member is provided inside one side of the member which is beside one of the protruding portions 5a to facilitate holding of the first housing 3 at a predetermined angle with respect to the second housing 5. A cable insertion through hole (not shown) is formed inside the other side of the member as the open/close axis X on the side of the other protrusion portion 5a for allowing an electric cable 21 (shown in FIG. 11 to FIG. 13) to be inserted. Similarly, a shaft member 9 as the vertical axis Y as shown in the drawings is made of metal. A cable insertion through hole (not shown) is formed in the shaft member 9. The liquid crystal display part 2 is supported through the vertical axis Y so as to be capable of being flipped over within a predetermined angle. The electric cable 21 is inserted through the cable insertion through holes of the member as the open/close axis X and the member as the vertical axis Y to connect the first housing 3 and the second housing 5 electrically.

Figure 4:
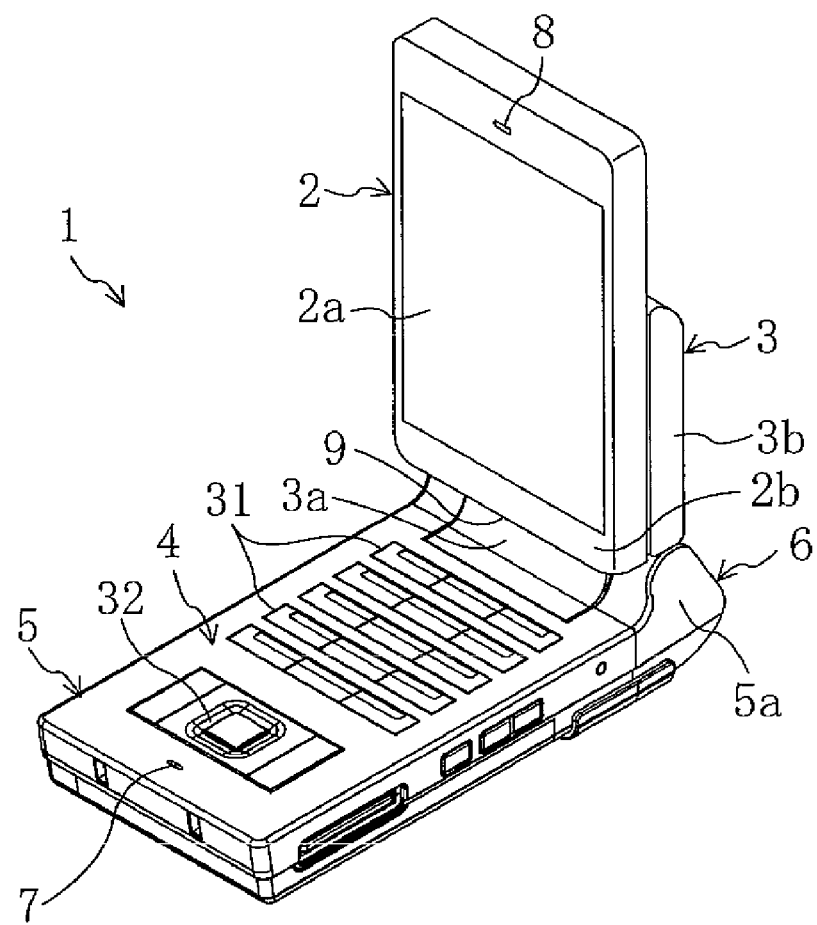
FIG. 4 is a perspective view showing the foldable mobile phone in an opened state where a liquid crystal display part is set in a portrait orientation and faces front.

As shown in FIG. 4 and the like, the liquid crystal display part 2 is in a substantially rectangular plate shape having a linear lower end in the portrait orientation. A rectangular liquid crystal display 2a is provided so as to occupy the front face of the liquid crystal display part 2 dominantly. A speaker 8 for making/receiving calls is provided at the upper end part of the liquid crystal display part 2 in the portrait orientation. A back side liquid crystal display 11 for displaying time or the like is provided on the back face (back side) of the liquid crystal display part 2 so that the user can view the time and the like in the folded closed state. Each corner of the liquid crystal display part 2 including a lower end corner 2b is rounded in view of design, safety, and the like.

In the foldable mobile phone 1 of the present embodiment, when the front face of the liquid crystal display part 2 faces up, the user can manipulate the information input buttons 31 and the function button 32 arranged in the same layout as that in the portrait orientation while viewing the liquid crystal display 2a of the liquid crystal display part 2 either in the portrait orientation or in the landscape orientation.

Figure 11:
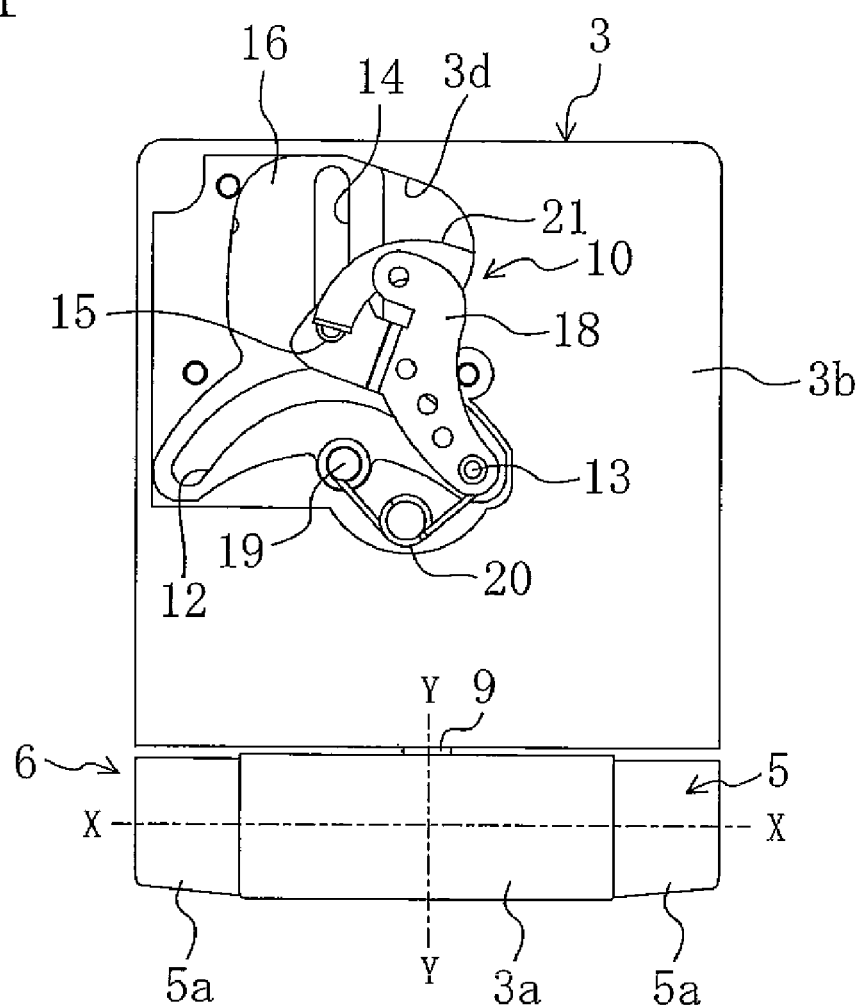
FIG. 11 is a front view showing a cam mechanism and the vicinity thereof in the portrait orientation.
Figure 12:
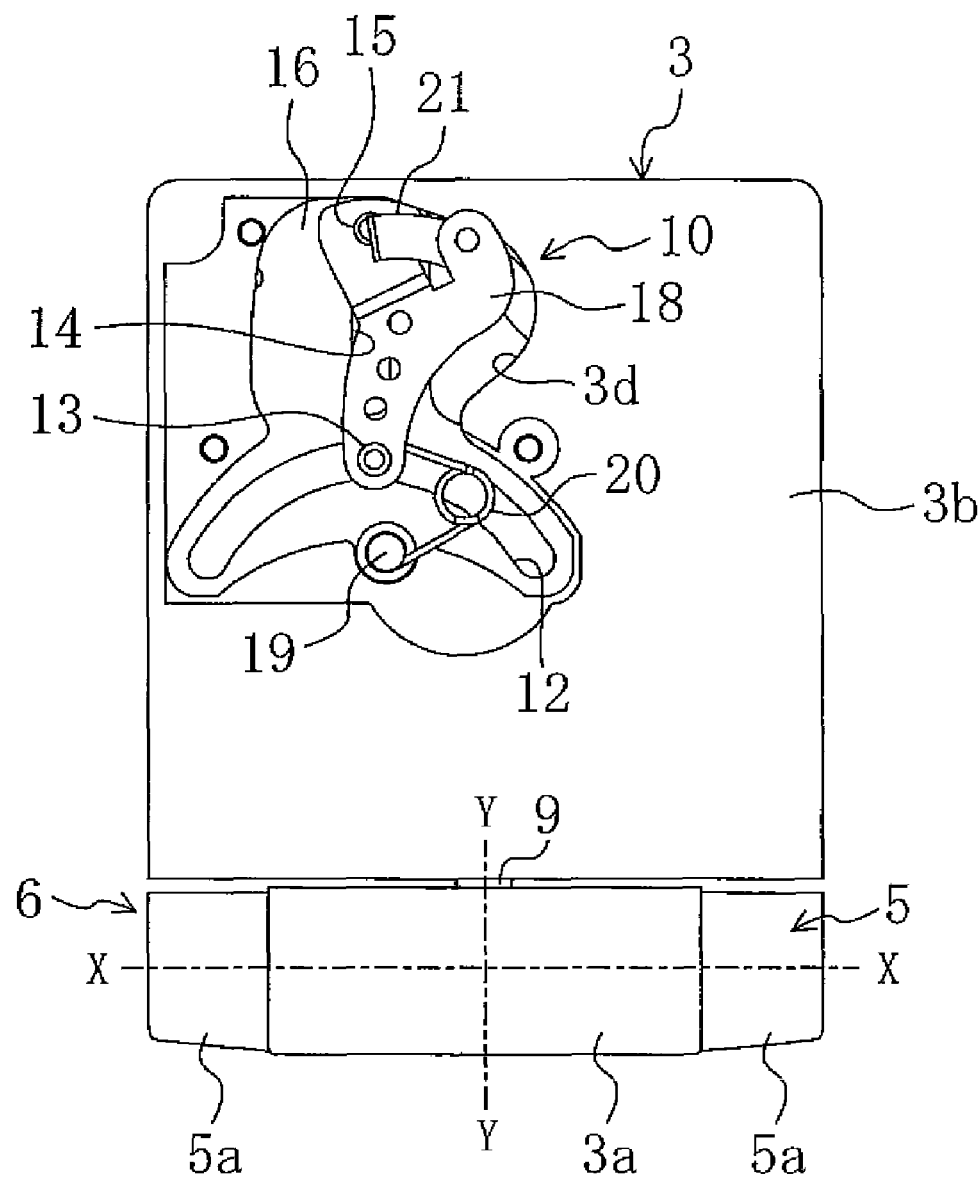
FIG. 12 is a front view showing the cam mechanism and the vicinity thereof in a switching process.
Figure 13:
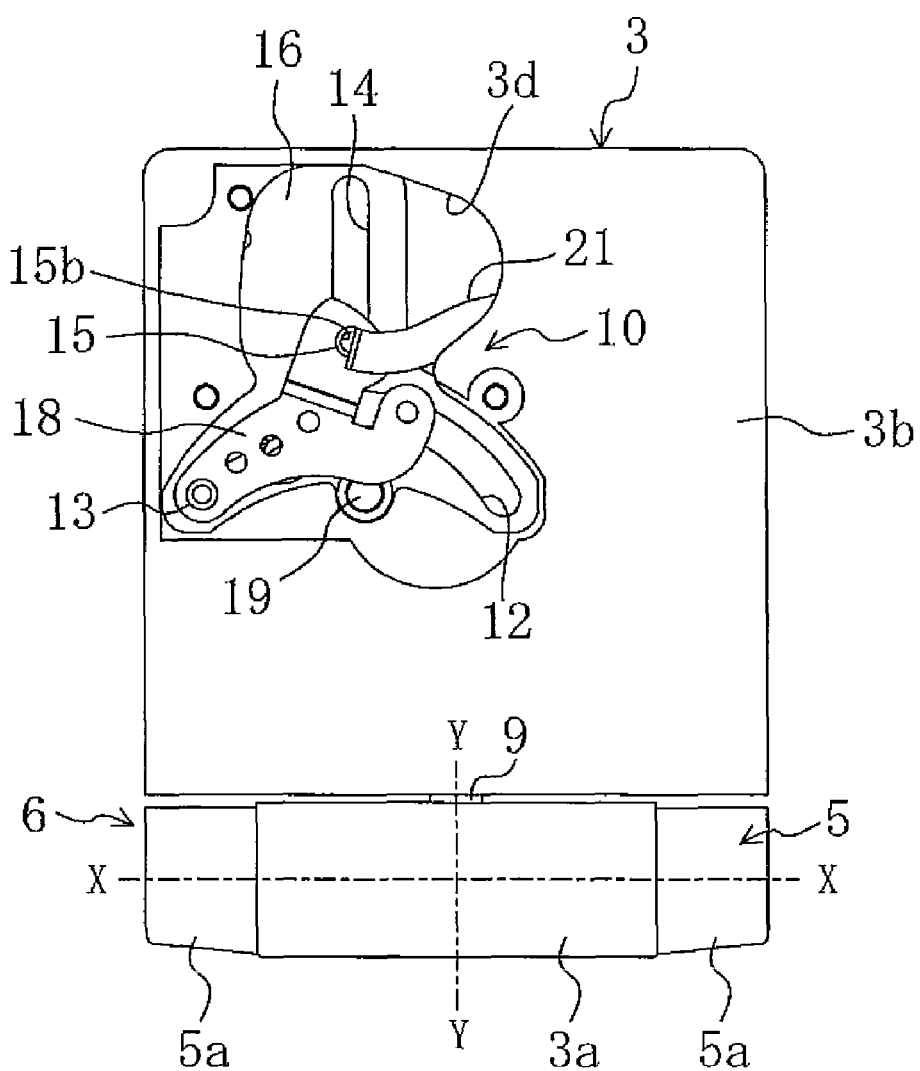
FIG. 13 is a front view showing the cam mechanism and the vicinity thereof in the landscape orientation.
Figure 14:
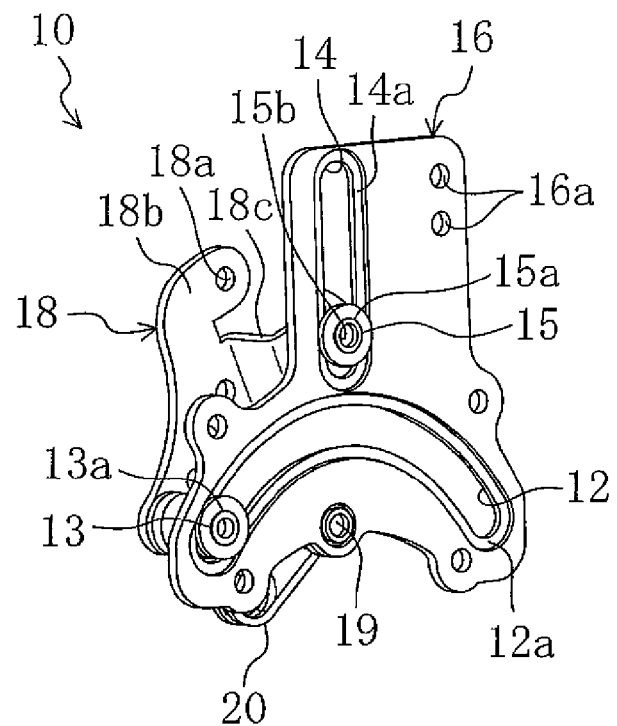
FIG. 14 is a perspective view of the cam mechanism when viewed from tilting back.
Figure 15:
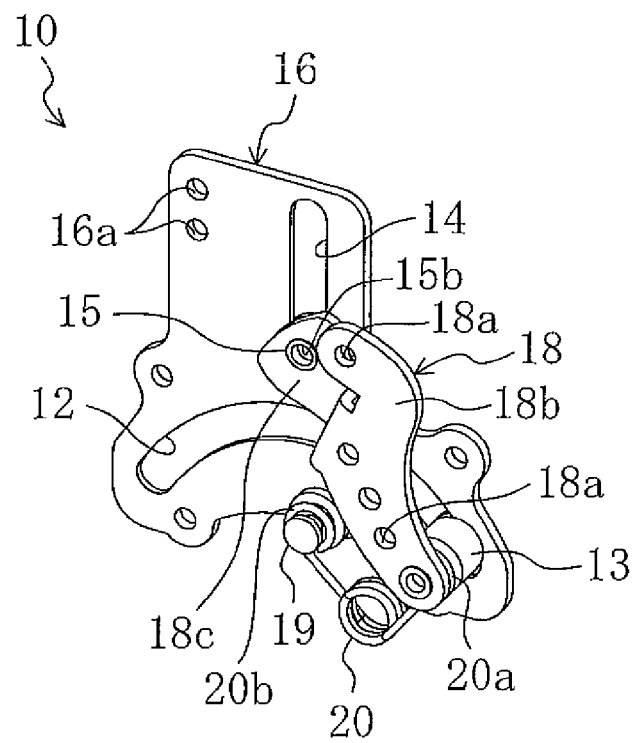
FIG. 15 is a perspective view of the cam mechanism when viewed from tilting front.

As shown in FIG. 11 to FIG. 13, a cam opening 3d is formed in the upper left part on the front face side (the liquid crystal display part 2 side) of the first housing 3. Inside the cam opening 3d, a cam mechanism 10 is provided as a support mechanism for supporting the liquid crystal display part 2 switchably between the portrait orientation and the landscape orientation. As shown in FIG. 14 and FIG. 15 in an enlarged scale, the cam mechanism 10 is composed of a transverse guide groove 12, a vertical guide groove 14, a first guide pin 13, and a second guide pin 15. The transverse guide groove 12 extends in the widthwise direction in the first housing 3 and curves in the central part thereof upwardly. The vertical guide groove 14 extends linearly and vertically in the first housing 3. The first guide pin 13 is provided on the back face of the liquid crystal display part 2 so as to be engaged slidably with the transverse guide groove 12. The second guide pin 15 is provided on the back face of the liquid crystal display part 2 so as to be engaged slidably with the vertical guide groove 14.

Specifically, the transverse guide groove 12 and the vertical guide groove 14 are formed in a metal guide plate 16 fitted to the first housing 3. The transverse guide groove 12 is a curved opening curving in the central part thereof upwardly and is formed so that the central part thereof is displaced left of the first housing 3 when viewed from the front side of the foldable mobile phone 1. The vertical guide groove 14 forms a periphery of a linear opening formed vertically above the uppermost part of the upwardly curving transverse guide groove 12. The opening peripheries of the guide grooves 12, 14 in the face opposed to the liquid crystal display part 2 form steps 12a, 14a lower than the other parts of the guide grooves 12, 14, respectively. The guide plate 16 is fixed to the first housing body 3b by inserting a pin (not shown) into a through hole 16a thereof and fastening it or by another way so that the guide plate 16 is located in the intermediate part in the thickness direction of the first housing 3. In this way, the second guide pin 15, which corresponds to a support shaft provided vertically to a conventional liquid crystal display part, is displaced so as to be located at the upper left part of the first housing 3 when viewed from the front side of the foldable mobile phone 1.

On the other hand, to the back face of the liquid crystal display part 2, a metal link member 18 is fitted. The link member 18 includes a plate-shaped mounting portion 11b in which through holes 18a are formed for fastening or positioning the link member 18 to the back face of the liquid crystal display part 2 and a distal end portion 18c in an L shape in section continuing from the mounting portion 18b. The first guide pin 13 is arranged at one end of the link member 18, that is, the tip end part of the mounting portion 15b so as to extend vertically toward the first housing 3. The second guide pin 15 is arranged at the other end of the line member 18, that is, the end part of the distal end portion 11c so as to extend vertically toward the first housing 3. The guide pins 13, 15 are tapered to an extent that the distal ends thereof are inserted in the guide grooves 12, 14, respectively. The distal ends thereof are inserted in the guide grooves 12, 14 and are caulked so as to form annular parts 13a, 15a, respectively. The annular parts 13a, 15a slide on the steps 12a, 14a, respectively. With this arrangement, the guide pins 13, 15 are prevented from falling off from the guide grooves 12, 14, respectively, so that the liquid crystal display part 2 is engaged with the first housing 3 slidably with it prevented from falling off from the first housing 3.

A spring fixing pin 19 extends from the lower part of the guide plate 16 vertically toward the liquid crystal display part 2. A helical coil spring 20 as an elastic member is fixed to the spring fixing pin 19. The helical coil spring 20 has ends 20a, 20h each in a ring shape. One 20a of the ends 20a, 20b is fitted rotatably about the outer periphery of the first guide pin 13 while the other end 20b thereof is fitted rotatably about the outer periphery of the spring fixing pin 19. With this arrangement, the helical coil spring 20 is supported so as to be swingable in widthwise direction about the spring fixing pin 19, and the elastic force thereof is applied to the liquid crystal display part 1 in switching the liquid crystal display part 2 from the portrait orientation to the landscape orientation. The liquid crystal display part 2 is arranged so as to receive the elastic force by which the orientation thereof is switched from the portrait orientation to the landscape orientation. Specifically, as shown in FIG. 12, when the first guide pin 13 approaches the spring fixing pin 19 the most, namely, when the second guide pin 15 is located at the uppermost end of the vertical guide groove 14, the helical coil spring 20 forms a maximum deflection angle. The first guide pin 13 is displaced left or right therefrom to urge to set the liquid crystal display part 2 in the portrait orientation or in the landscape orientation.

The transverse guide groove 12, the vertical guide groove 14, the first guide pin 13, the second guide pin 15, and the helical coil spring 20 are so composed to be assembled into a unit, and the cam mechanism 10 of the thus assembled unit is mounted to the first housing 3. The guide pins 13, 15 and the helical coil spring 20 serving as movable portions of the cam mechanism 10 move in the cam opening 3d in the first housing 3.

Though not shown in detail, one end of the electric cable 21 passing through the cam opening 3d is connected to the substrate on the back face of the liquid crystal display 2a while the other end thereof passing through the vertical axis Y, and the horizontal axis X is connected to the substrate of the second housing 5.

Use of Foldable Mobile Phone

The use of the foldable mobile phone 1 in accordance with the present embodiment will be described next.

Figure 2:
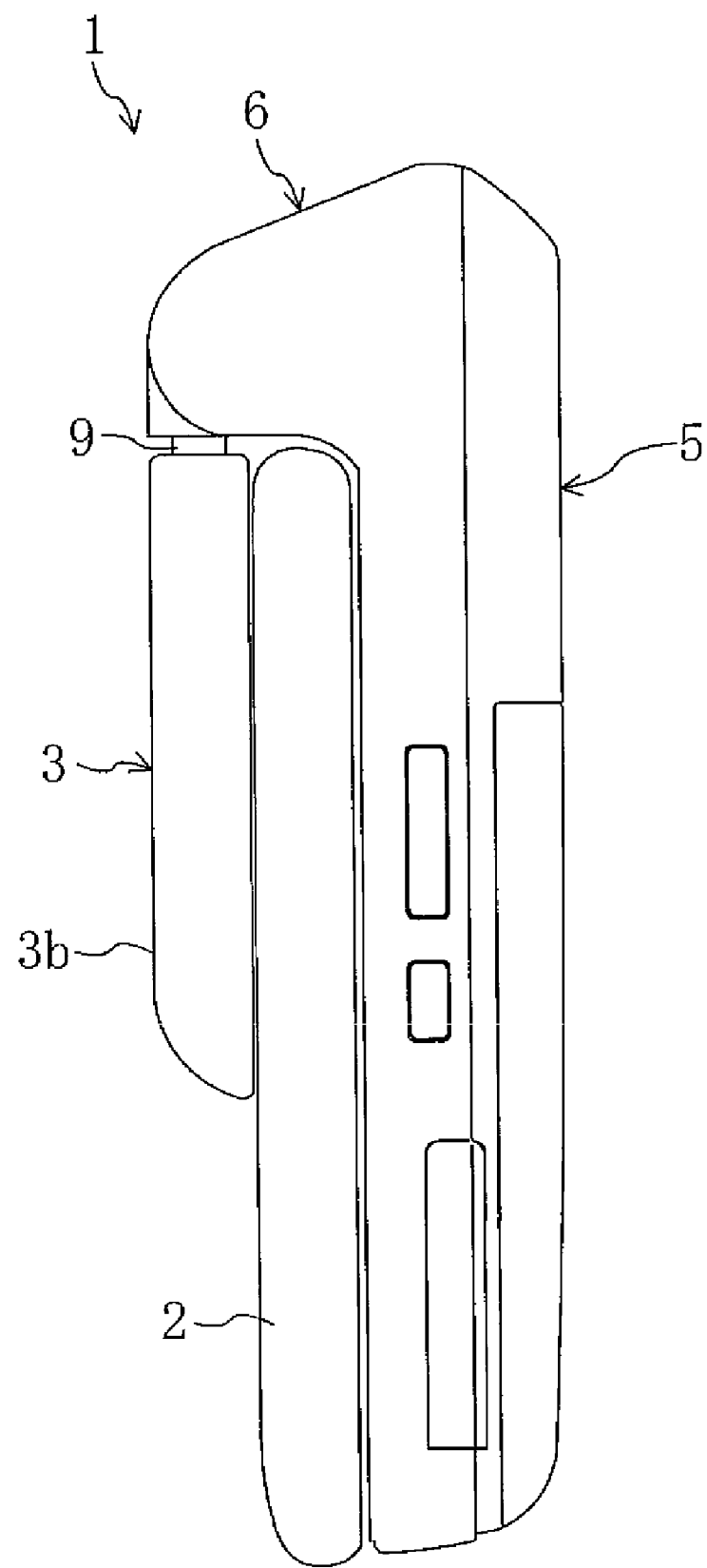
FIG. 2 is a side view showing the foldable mobile phone in the folded closed state in accordance with the embodiment of the present invention.
Figure 3:
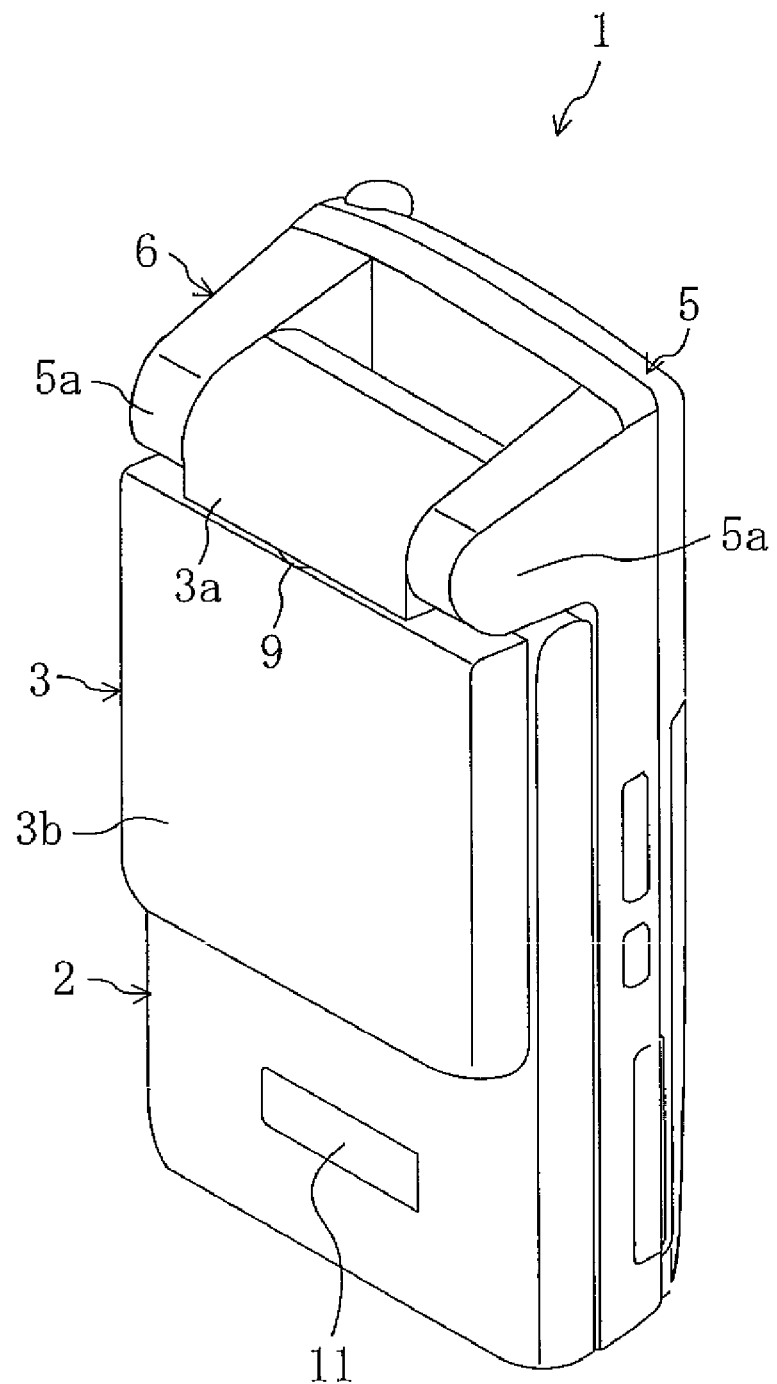
FIG. 3 is a perspective view showing the foldable mobile phone in the folded closed state in accordance with the embodiment of the present invention.

First, as shown in FIG. 1 to FIG. 3, the first housing 3 and the second housing 5 are closed in the folded closed state when the foldable mobile phone 1 is not used or is in the standby state.

Then, as shown in FIG. 4, when the first housing 3 and the second housing 5 are opened, the liquid crystal display part 2 and the operation part 4 come into sight. For usual call making and mail transmission/reception, the user manipulates the operation part 4 for key input with the liquid crystal display part 2 set portrait.

Figure 6:
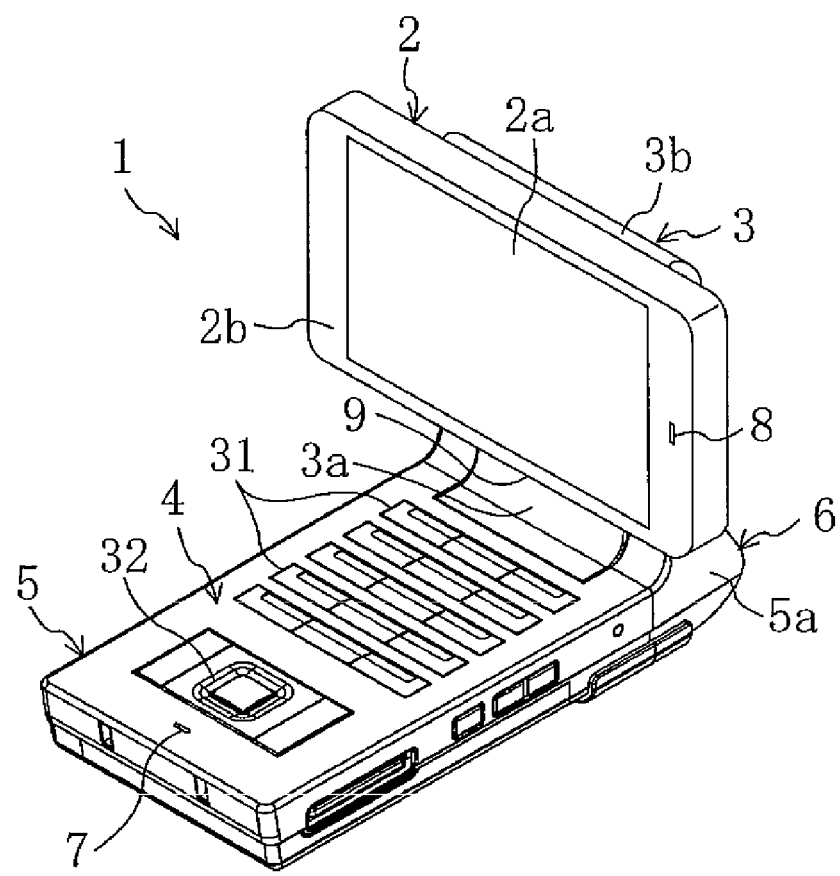
FIG. 6 is a perspective view showing the foldable mobile phone in the opened state where the liquid crystal display part is set in a landscape orientation and faces front.

On the other hand, in order to view a landscape image for watching a terrestrial digital TV program or for drafting or reading a mail in English language, the user changes the liquid display part 2 from the portrait orientation to the landscape orientation by rotating the liquid crystal display part 2 clockwise, as shown in FIG. 6.

Figure 7:
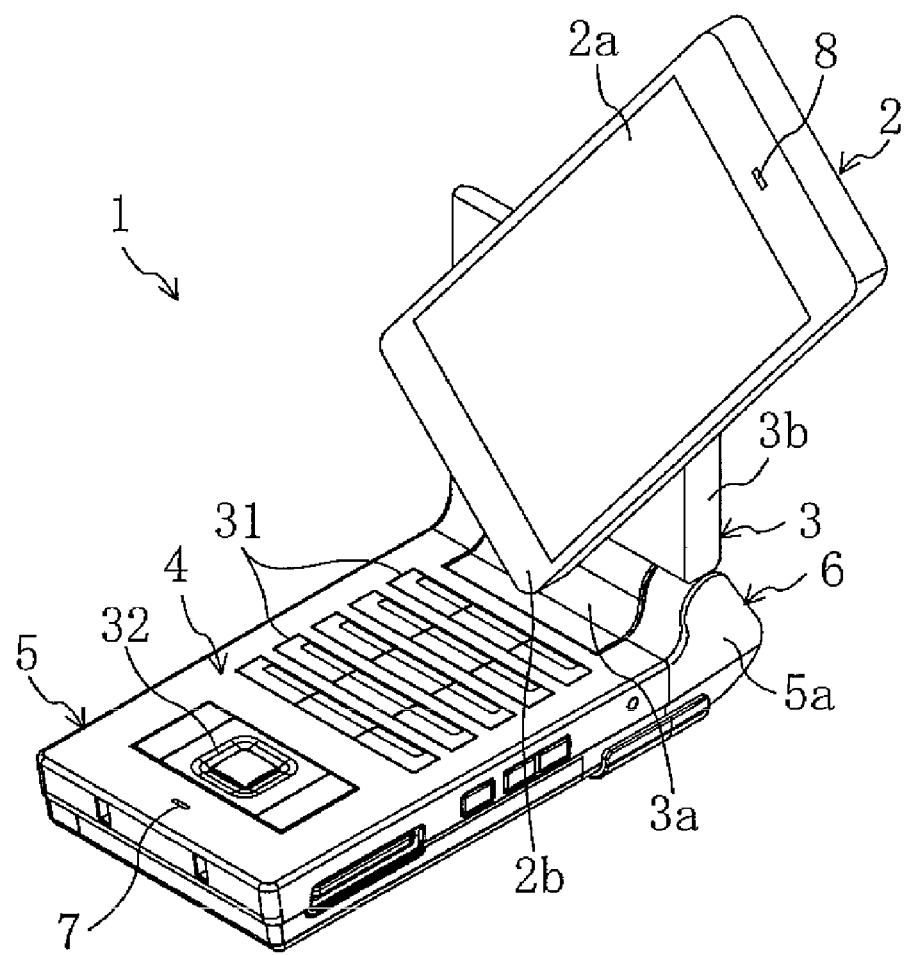
FIG. 7 is a perspective view showing the foldable mobile phone in the opened state where the liquid crystal display part facing front is being switched to the portrait orientation or the landscape orientation.

For this changing, the user first rotates the liquid crystal display part 2 clockwise when viewed from the front side against the spring force of the helical coil spring 20 to move the lower end corner 2b up to the point shown in FIG. 7. When doing so, the second guide pin 15, which has been located at the lower end of the vertical guide groove 14 as viewed from the front side of the foldable mobile phone 1, moves to the upper end thereof while the first guide pin 13, which has been located at the right end of the transverse guide groove 12, moves to the center thereof, as shown in FIG. 12.

Next, when the helical coil spring 20 exceeds its maximum deflection angle, the spring force thereof assists switching of the liquid crystal display part 2 into the landscape orientation. When doing so, the second guide pin 15, which has been located at the upper end of the vertical guide groove 14 when viewed from the front side of the foldable mobile phone 1, moves to the lower end thereof while the first guide pin 13, which has been located at the center of the transverse guide groove 12, moves to the left end thereof, as shown in FIG. 13.

In this way, the cam mechanism 10 allows the first guide pin 13 of the liquid crystal display part 2 to slide in the transverse guide groove 12 while at the same time allowing the second guide pin 15 thereof to slide in the vertical guide groove 14.

Figure 16:
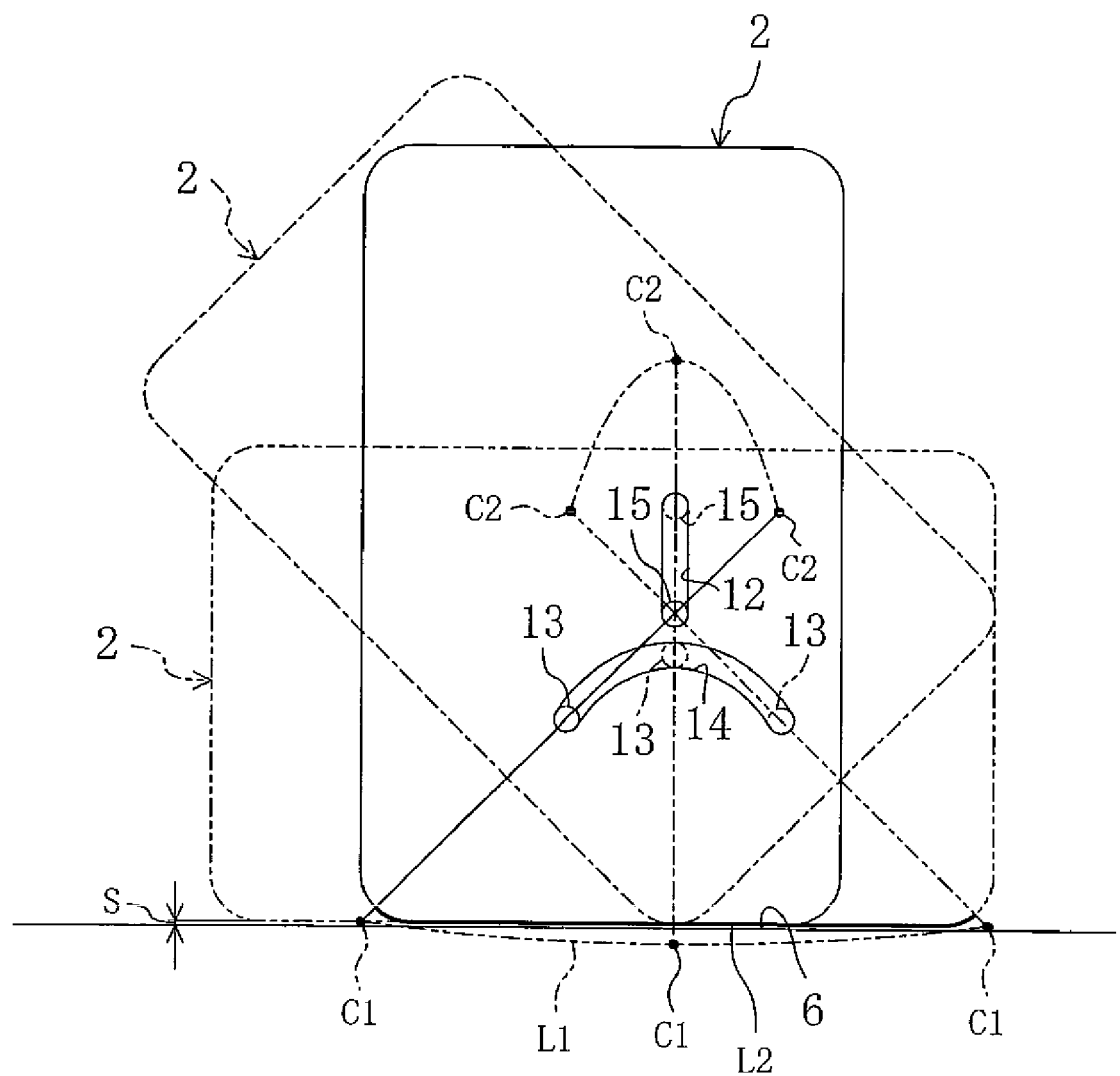
FIG. 16 is an explanatory view showing tracks of a lower end corner of a first housing.

FIG. 16 shows a track drawn by a point C2 on a line connecting the vertex C1 of the lower end corner 2b and the second guide pin 15 under the restriction by the cam mechanism 10. The vertex C1 of the lower end corner 2b draws a track L1 which enters the region of the hinge portion 6. Actually, however, the lowermost end of the lower end corner 2b, which is rounded, is guided and supported in switching so as to move on a linear track L2 where a space S is kept from the hinge portion 6. Accordingly, the liquid crystal display part 2 never moves lower than the track L2. This means no invitation of contact of the lower end of the liquid crystal display part 2 with the hinge portion 6 even if the lower end of the liquid crystal display part 2 is not rounded along the radius about the support shaft.

In the landscape orientation shown in FIG. 6, the widthwise center of the liquid crystal display part 2 is located substantially at the widthwise center of the first housing 3. The user can access a quiz program or utilizes teleshopping or bank transfer through the TV by key input through the operation part 4 with the liquid crystal display 2a set so that a landscape image is displayed large.

For returning the liquid crystal display part 2 from the landscape orientation to the portrait orientation, the user rotates the right lower end corner 2b of the liquid crystal display part 2 against the spring force of the helical coil spring 20 anticlockwise when viewed from the front side. When the helical coil spring 20 exceeds its maximum deflection angle, the spring force thereof assists returning of the liquid crystal display part 2 to the portrait orientation shown in FIG. 4.

Description will be given next of the case where the foldable mobile phone 1 is used with the liquid crystal display part 2 flipped over.

Figure 5:
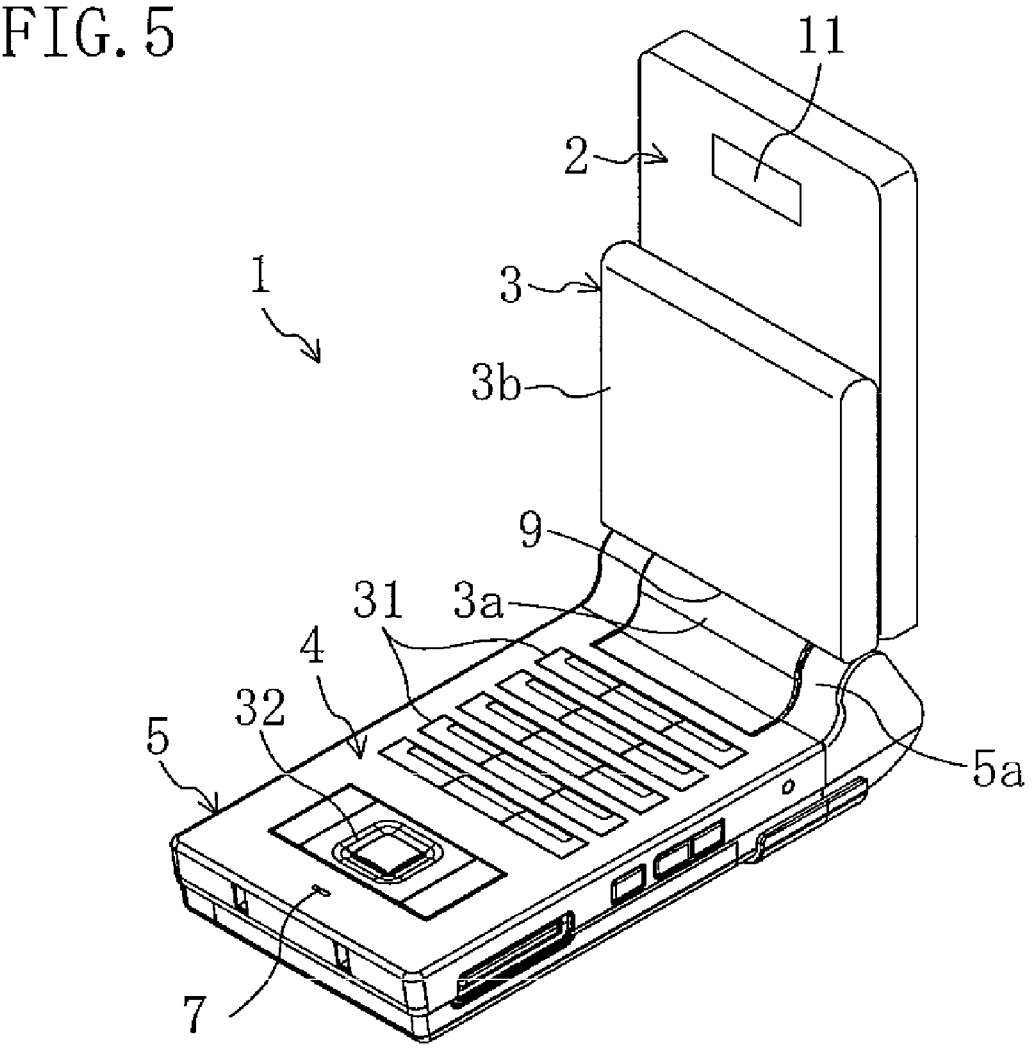
FIG. 5 is a perspective view showing the foldable mobile phone in the opened state where the liquid crystal display part is set in the portrait orientation and faces back.
Figure 10:
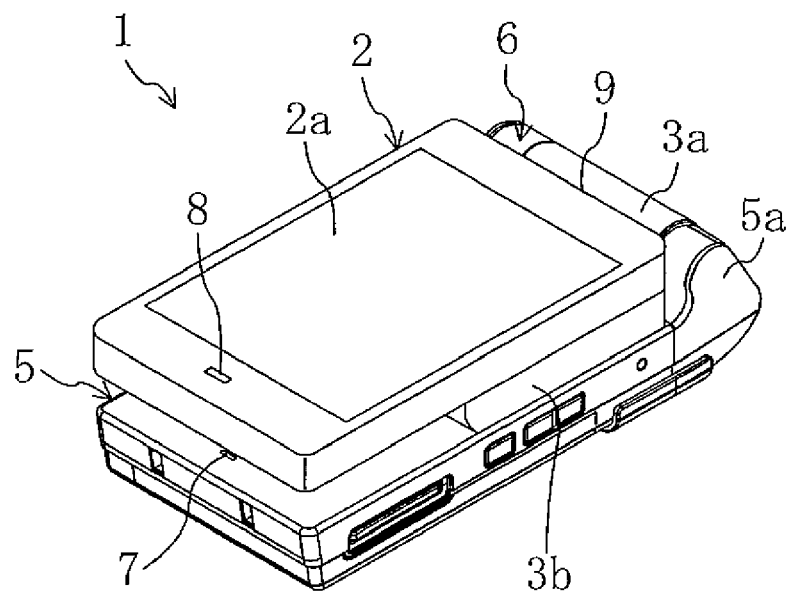
FIG. 10 is a perspective view showing the foldable mobile phone in the folded closed state where the liquid crystal display part is in the portrait orientation and faces up.

First, the liquid crystal display part 2 where the first housing 3 is opened as shown in FIG. 4 is rotated 180° about the vertical axis Y (the shaft member 9) to be flipped over (shown in FIG. 5). Then, as shown in FIG. 10, the first housing 3 is rotated about the open/close axis X to be closed.

In this state, the foldable mobile phone 1 can function as a usual TV receiver or a digital camera.

Figure 8:
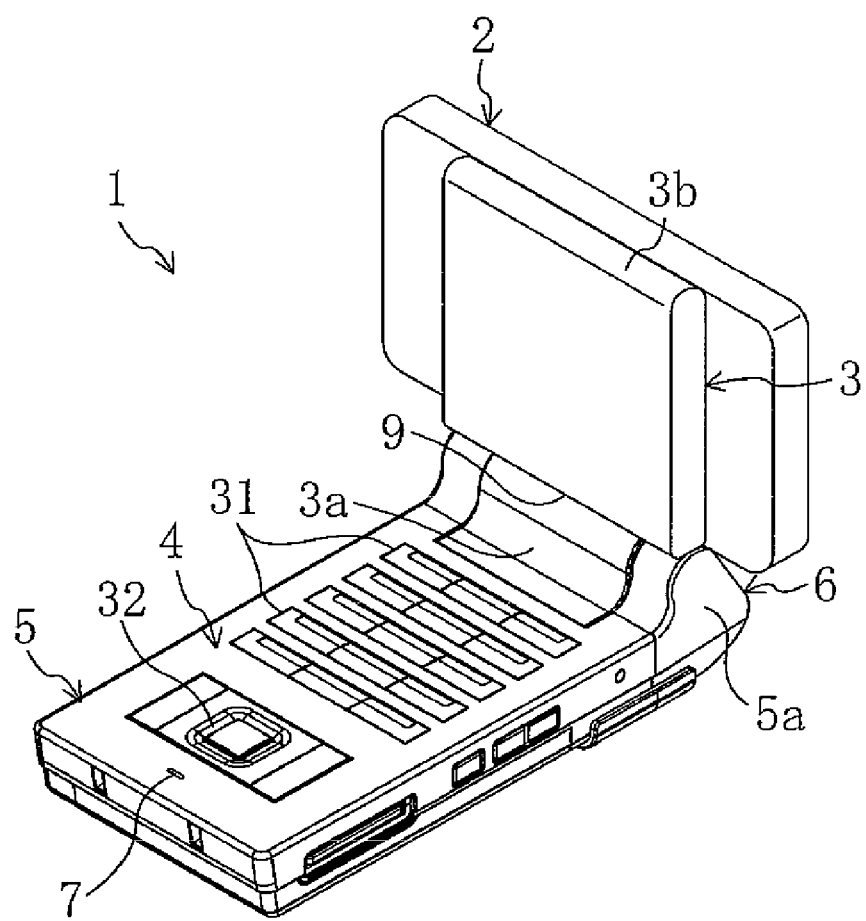
FIG. 8 is a perspective view showing the foldable mobile phone in a folded closed state where the liquid crystal display part is set in the landscape orientation and faces back.

Referring to another use, the state where the liquid crystal display part 2 faces up in the landscape orientation as shown in FIG. 6 is rotated 180° about the vertical axis Y to be flipped over, as shown in FIG. 8.

Figure 9:
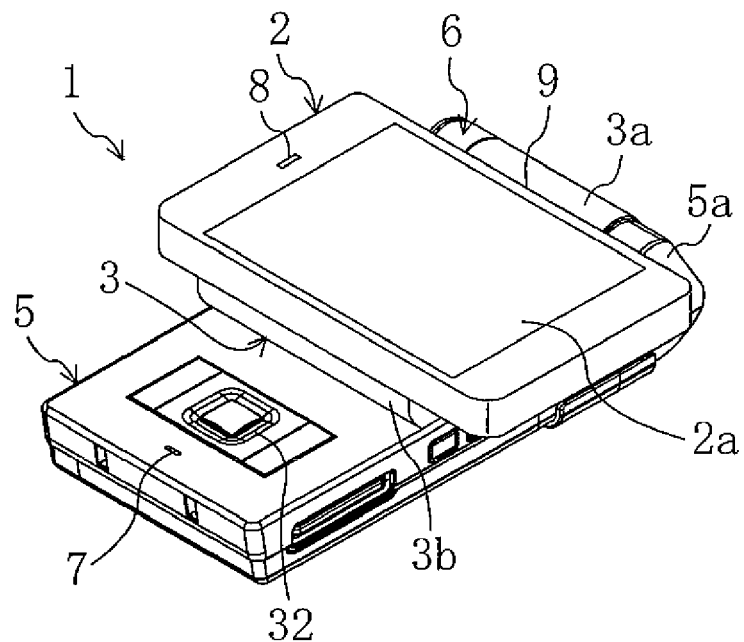
FIG. 9 is a perspective view showing the foldable mobile phone in the folded closed state where the liquid crystal display part is set in the landscape orientation and faces front.

Next, as shown in FIG. 9, the first housing 3 is rotated about the open/close axis X to be closed. As a result the liquid crystal display 2a in the landscape orientation comes into sight with the function button 32 exposed. In this state, the user can use the function button 32 while viewing a landscape image for inputting simple information in accessing a terrestrial digital TV program or for reading a mail in English language. Particularly, the user can use the function button 32 by his/her single hand for playing a video game while viewing a landscape image in the compactly folded state, which is convenient.

After use, the first housing 3 is opened to be set into the state shown in FIG. 8 and is then rotated about the vertical axis Y to be flipped over into the state shown in FIG. 6. Subsequently, the liquid crystal display part 2 is returned to the portrait orientation shown in FIG. 4, and then, the first housing 3 and the second housing 5 are closed to be in the standby state as shown in FIG. 1 to FIG. 3. It is possible that after the liquid crystal display part 2 in the state shown in FIG. 8 is returned to the portrait orientation first, and then, the first housing 3 is flipped over about the vertical axis Y to set the liquid crystal display part 2 in the state shown in FIG. 4. In both cases, the cam mechanism 10 allows the lower end corner 2b of the liquid crystal display part 2 to move along the hinge portion 6 to invite no contact of the liquid crystal display part 2 with the protruding portions 5a in rotating the liquid crystal display part 2 about the vertical axis Y.

Effects of Embodiment

As described above, in the foldable mobile phone 1 of the present embodiment, the hinge portion 6 connects the first housing 3 and the second housing 5 to each other foldably about the open/close axis X and supports the first housing 3 so that the first housing 3 can be flipped over about the vertical axis Y, and the cam mechanism 10 supports the liquid crystal display part 2 on the first housing 3 switchably between the portrait orientation and the landscape orientation. As a result, the user can easily manipulate the operation part 4 in which the information input buttons 31 and the like are arranged in the same layout as the accustomed layout in the portrait orientation while viewing the liquid crystal display 2a of the liquid crystal display part 2 in the landscape orientation. Further, the user can play a video game or so comfortably with the liquid crystal display part 2 in the compactly folded closed state set landscape.

Moreover, the cam mechanism 10 supports on the first housing 3 the liquid crystal display part 2 switchably between the portrait orientation and the landscape orientation and guides the liquid crystal display part 2 so that the lower end corner 2b of the liquid crystal display part 2 moves along the hinge portion 6 in switching the liquid crystal display part 2. This eliminates the need to round largely the lower end of the liquid crystal display part 2 and can set the liquid crystal display part 2 large with an increase in the entire size of the foldable mobile phone 1 suppressed. Further, the liquid crystal display part 2 can be switched easily between the portrait orientation and the landscape orientation, the liquid crystal display part 2 is prevented from coming into contact with the hinge portion 6 in flipping over the liquid crystal display part 2, and the user can easily manipulate the operation part 4 in which the information input buttons 31 and the like are arranged in the same layout as the accustomed layout in the portrait orientation while viewing the liquid crystal display part 2 even set landscape.

In the above embodiment, when the orientation of the liquid crystal display part 2 is switched with the aide of the cam mechanism 10, which can be attained with the contact prevented, the widthwise center of the liquid crystal display part 2 is positioned at the substantial widthwise center of the first housing 3 in either the portrait orientation or the landscape orientation. This leads to an increase in size of the liquid crystal screen and enables setting of the liquid crystal display part 2 at the widthwise center of the entirety not only in the portrait orientation but also in the landscape orientation. As a result, the foldable mobile phone 1 is improved in appearance, has excellent transverse balance with easy view of the liquid crystal screen provided, which means attainment of a foldable mobile phone 1 easily held by a single hand and excellent in usability.

In the above embodiment, the cam mechanism 10 is used as the support mechanism. Accordingly, the liquid crystal display part 2 is guided definitely so that the lower end corner 2b thereof moves along the hinge portion 6 in switching the orientation of the liquid crystal display part 2 with the contact prevented.

Further, in the above embodiment, the liquid crystal display part 2 is formed so as to have a linear lower end in the portrait orientation, and the cam mechanism 10 guides and supports the liquid crystal display part 2 in switching thereof between the portrait orientation and the landscape orientation so that the lower end corner 2b thereof moves along the hinge portion 6 on the linear track L2. Accordingly, the liquid crystal screen can be enlarged up to the vicinity of the lower end of the liquid crystal display part 2 in the portrait orientation, thereby leading to attainment of a foldable mobile phone 1 with excellent usability and a her large screen.

In the above embodiment, the first guide pin 13 of the liquid crystal display part 2 slides with it engaged with the transverse guide groove 12 while at the same time the second guide pin 15 thereof slides with it engaged with the vertical guide groove 14 so that the lower end corner 2b of the liquid crystal display part 2 moves along the hinge portion 6 in switching the liquid crystal display part 2 between the portrait orientation and the landscape orientation. With this simple structure, the liquid crystal display part 2 can be switched between the portrait orientation and the landscape orientation definitely with the contact prevented.

By providing the information input buttons 31 near the hinge portion 6 of the operation part 4 and the function button 32 apart from the hinge portion 6, the liquid crystal display part 2 in the landscape orientation can be flipped over and exposed with the first housing 3 closed. As a result the user can use the function button 32 not covered with the liquid crystal display part 2 in playing a video game or so comfortably while viewing the liquid crystal display part 2 in the compactly folded state set landscape.

Provision of the liquid crystal display 2a in the display part results in a thin and low-cost foldable mobile equipment.

The use of the foldable mobile equipment as the foldable mobile phone attains a foldable mobile phone 1 with high salability capable of being used with the display part set in various states.

Moreover, in the above embodiment, the helical coil spring 20 is provided in the cam mechanism 10 for urging the liquid crystal display part 2 to be into the portrait orientation or the landscape orientation so that switching is assisted by the helical coil spring 20. This enables the user to change the liquid crystal display part 2 from/to the portrait orientation to/from the landscape orientation by a fingertip by his/her single hand.

The helical coil spring 20, which has a simple structure, is hardly broken. The helical coil spring 20 in the above embodiment is fixed at one end thereof to the first guide pin 13 while being fixed at the other end thereof to the spring fixing pin 19 of the first housing 3. This attains a low-cost smooth cam mechanism 10.

In addition, in the above embodiment, the cam mechanism 10 is assembled in a unit so that the first guide pin 13 and the second guide pin 15 can be set accurately in the guide grooves 12, 14, respectively. This facilitates mounting of the cam mechanism 10. Further, the cam mechanism 10 is formed of a metal member, thereby attaining smooth movement thereof and increasing its rigidity.

Other Embodiments

The present invention may have any of the following structures in the above embodiment.

Figure 17:
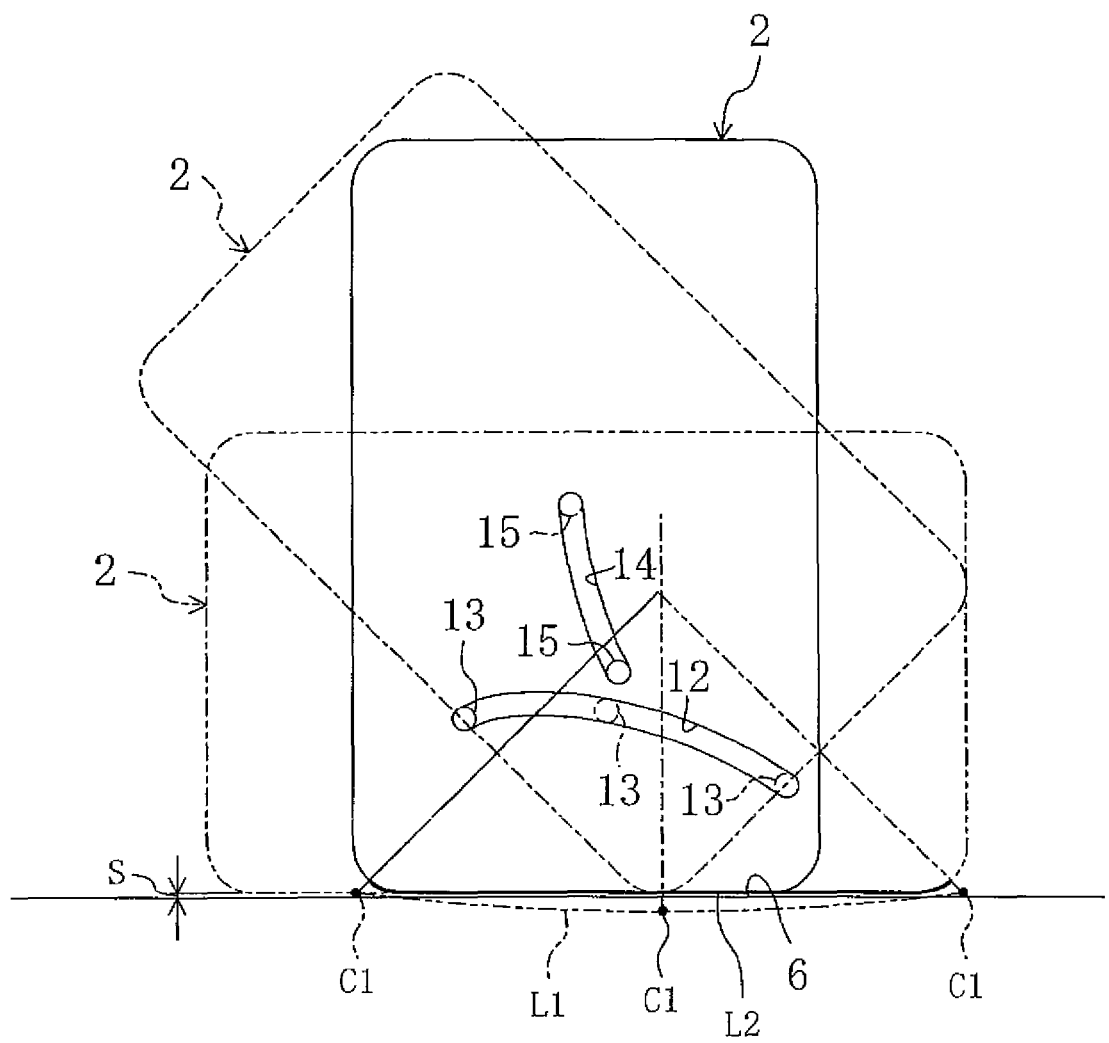
FIG. 17 is a view corresponding to FIG. 6 in accordance with another embodiment.

Namely, the shapes of the transverse guide groove 12 and the vertical guide groove 14 are not limited to those in the above embodiment. For example, the guide grooves 12, 14 may have the shapes shown in FIG. 17. Specifically, the vertical guide groove 14 may be in a curved shape rather than the linear shape. In this case, as well, the lowermost end of the rounded lower end corner 2b is guided and supported so as to move on the linear track L2 with a given space S kept from the hinge portion 6.

The cam mechanism 10 in the above embodiment guides and supports the liquid crystal display part 2 so that the lower end corner 2b thereof moves along the hinge portion 6 on the linear track L2, but the lower end corner 2b may move on a curved track. In this case, the shape of the transverse guide groove 12 is adjusted to adjust the track L2 of the lower end corner 2b of the liquid crystal display part 2. If doing so, the camera or the like can be provided in a swelling part between the lower end of the first housing 3 and the hinge portion 6. In this case, the lower end corner 2b of the liquid crystal display part 2 is prevented from coming into contact with the swelling part, as well.

Only one transverse guide groove 12 is formed in the above embodiment, but two transverse guide grooves may be formed. For forming two transverse guide grooves, a more upwardly curved second transverse guide groove is formed above the vertical guide groove 14 so that a second first guide pin provided at the ring member 18 moves along the second transverse guide groove. For example, the second widthwise groove may be formed along the track drawn by the point C2 shown in FIG. 16. This attains further smooth orientation switching of the liquid crystal display part 2 and definite support of the liquid crystal display part 2 against the force separating the liquid crystal display part 2 from the first housing 3.

The transverse guide grove 12, the vertical guide groove 14, the fist guide pin 13, and the second guide pin 15 are assembled into the unit in the above embodiment, but may not be assembled into the unit. Namely, the transverse guide groove 12 and the vertical guide groove 14 may be formed in the first housing body 3b of the first housing 3 while the first guide pin 13 and the second guide pin 15 are formed integrally with the back face of the liquid crystal display part 2.

The helical coil spring 20 always urges the liquid crystal display part 2 in switching from/to the portrait orientation to/from the landscape orientation in the above embodiment, but may urge it only in switching to the portrait orientation or the landscape orientation.

The cam mechanism 10 in the above embodiment rotates the liquid crystal display part 2 clockwise when viewed from the front side of the liquid crystal display part 2 for switching it from the portrait orientation to the landscape orientation in the above embodiment, but may rotate it anticlockwise for the switching.

Still further, the widthwise center of the liquid crystal display part 2 in either the portrait orientation or the landscape orientation is positioned at the substantial widthwise center of the first housing 3, but may be displaced left or right.

The above embodiment uses the cam mechanism 10 as the support mechanism, but is not limited to this arrangement. Namely, only what is required for the support mechanism is to guide and support the liquid crystal display part 2 so that the lower end corner 2b of the liquid crystal display part 2 moves along the hinge portion 6 in switching the liquid crystal display part 2 between the portrait orientation and the landscape orientation.

The liquid crystal display part 2 in the above embodiment includes the liquid crystal display 2a, but may include an organic EL display instead. The organic EL display attains high luminance at low power consumption and is excellent in viewability, response speed, lifetime, and power consumption.

The foldable mobile equipment in the present invention is applied to a foldable mobile phone in the above embodiment and is applicable to foldable mobile equipment of any of a PHS, a PDA, a PC, an electronic dictionary, an electric calculator, and the like. Simply, the applicable foldable mobile equipment includes the hinge portion which connects the first housing and the second housing foldably about the open/close axis and which supports the first housing so that the first housing can be flipped over about the vertical axis vertical to the open/close axis.

The above embodiments are mere essentially preferable examples and are not intended to limit the present invention, the applicable objects, and the usages thereof.

Industrial Applicability

As explained above, the present invention is useful for foldable mobile equipment including a support mechanism for supporting a display part so that the display part is switchable between a portrait orientation and a landscape orientation, such as foldable mobile phones.

The invention claimed is:

1. Foldable mobile equipment, comprising:
   a first housing including a display part at a front face thereof;
   a second housing including an operation part at a front face thereof;
   a hinge portion which connects the first housing and the second housing to each other foldably about an open/close axis and supports the first housing so that the first housing is capable of being flipped over about a vertical axis vertical to the open/close axis,
   wherein the display part is supported on the first housing through a support mechanism switchably between a portrait orientation and a landscape orientation,
   a cam mechanism guides and supports the display part so that the lower end corner of the display part moves along the hinge portion on a straight track in switching the display part between the portrait orientation and the landscape orientation, and
   the display part has a linear lower end in the portrait orientation.

2. The foldable mobile equipment of claim 1,
   wherein the support mechanism guides and supports the display part so that a lower end corner of the display part moves along the hinge portion in switching the display part between the portrait orientation and the landscape orientation.

3. The foldable mobile equipment of claim 2,
   wherein either widthwise center of the display part in the portrait orientation or in the landscape orientation is located at a substantial widthwise center of the first housing in the respective orientations.

4. The foldable mobile equipment of claim 2,
   wherein the support mechanism is composed of a cam mechanism.

5. The foldable mobile equipment of claim 2,
   wherein the operation part includes information input buttons near the hinge portion and a function button apart from the hinge portion.

6. The foldable mobile equipment of claim 2,
   wherein the display part includes a liquid crystal display.

7. The foldable mobile equipment of claim 2,
   wherein the display part includes an organic EL display.

8. The foldable mobile equipment of claim 2, which is a foldable mobile phone.

9. The foldable mobile equipment of claim 1,
   wherein the cam mechanism is composed of a transversely extending and upwardly curved transverse guide groove formed in the first housing, and a linear vertical guide groove formed in the first housing, a first guide pin provided at a back face of the display part and slidably engaged with the transverse guide groove, and a second guide pin provided at the back face of the display part and slidably engaged with the vertical guide groove.

10. Foldable mobile equipment, comprising:
    a first housing including a display part at a front face thereof;
    a second housing including an operation part at a front face thereof;
    a hinge portion which connects the first housing and the second housing to each other foldably about an open/close axis and supports the first housing so that the first housing is capable of being flipped over about a vertical axis vertical to the open/close axis,
    wherein the display part is supported on the first housing through a support mechanism switchably between a portrait orientation and a landscape orientation,
    the support mechanism is composed of a cam mechanism which guides and supports the display part so that a lower end corner of the display part moves along the hinge portion on a straight track in switching the display part between the portrait orientation and the landscape orientation, and the display part has a linear lower end in the portrait orientation,
    the operation part is provided with information input buttons in a position closer to the hinge portion, and a function button in a position further from the hinge portion, and
    the display part in the landscape orientation whose screen faces a front surface side covers the information input buttons, and is configured to be able to operate the function button with the function button exposed.

* * * * *